(12) United States Patent
Bulman

(10) Patent No.: US 8,601,787 B2
(45) Date of Patent: Dec. 10, 2013

(54) ROCKET NOZZLES FOR UNCONVENTIONAL VEHICLES

(75) Inventor: Melvin J. Bulman, Orangevale, CA (US)

(73) Assignee: Aerojet—General Corporation, Rancho Cordova, CA (US)

( * ) Notice: Subject to any disclaimer, the term of this patent is extended or adjusted under 35 U.S.C. 154(b) by 0 days.

(21) Appl. No.: 13/462,909

(22) Filed: May 3, 2012

(65) Prior Publication Data

US 2012/0233983 A1 Sep. 20, 2012

Related U.S. Application Data

(63) Continuation of application No. 12/072,487, filed on Feb. 26, 2008, now Pat. No. 8,186,145.

(51) Int. Cl.
*F02K 9/66* (2006.01)

(52) U.S. Cl.
USPC .......................................... 60/201; 244/3.23

(58) Field of Classification Search
USPC ............... 60/228, 229, 263, 201; 239/265.19, 239/265.25; 244/3.22, 3.23
See application file for complete search history.

(56) References Cited

U.S. PATENT DOCUMENTS

| | | | |
|---|---|---|---|
| 3,502,288 A | 3/1970 | Pavlin et. al. | |
| 3,540,679 A | 11/1970 | McCullough et al. | |
| 3,777,490 A | 12/1973 | Weber et al. | |
| 3,806,063 A | 4/1974 | Fitzgerald | |
| 4,017,040 A | 4/1977 | Dillinger et al. | |
| 4,018,384 A | 4/1977 | Fitzgerald et al. | |
| 4,066,214 A | 1/1978 | Johnson | |
| 4,589,594 A * | 5/1986 | Kranz | 239/265.25 |
| 4,632,336 A | 12/1986 | Crepin | |
| H236 H * | 3/1987 | Maykut | 244/3.22 |
| 4,724,738 A | 2/1988 | Johnson | |
| 4,967,982 A | 11/1990 | Bagley | |
| 6,298,658 B1 | 10/2001 | Bak | |
| 6,591,603 B2 | 7/2003 | Dressler et al. | |
| 6,701,705 B1 | 3/2004 | Guirguis | |

OTHER PUBLICATIONS

Hatfield, S., "Project Orion Overview and Prime Contractor Announcement," NASA, Aug. 31, 2006.
Orbital Sciences Corporation, "Orion Crew Exploration Vehicle," Launch Abort System (LAS) Fact Sheet, Nov. 2006.

* cited by examiner

*Primary Examiner* — Andrew Nguyen
(74) *Attorney, Agent, or Firm* — Wiggin and Dana LLP; Gregory S. Rosenblatt

(57) ABSTRACT

Improved rocket nozzle designs for vehicles with nozzles embedded in or protruding from surfaces remote from the desired thrust axis. The nozzle configurations are for rocket vehicles where the nozzles are not located at the optimal thrust axis of the vehicle. Two examples include nozzles located on the forward end of the vehicle (also called tractor nozzles) and attitude control nozzles located on the periphery of the vehicle. More particularly, the disclosed nozzle shapes enhance the axial thrusts and/or maneuver torques on the vehicle. These unconventional nozzle shapes improve vehicle performance.

4 Claims, 13 Drawing Sheets

ROCKET NOZZLES FOR UNCONVENTIONAL VEHICLES

CROSS REFERENCE TO RELATED APPLICATION(S)

This patent application is a continuation of U.S. patent application Ser. No. 12/072,487, titled "Rocket Nozzles for Unconventional Vehicles," that was filed on Feb. 26, 2008 and is now U.S. Pat. No. 8,186,145. The disclosure of U.S. Ser. No. 12/072,487 is incorporated by reference herein in its entirety.

U.S. GOVERNMENT RIGHTS

N.A.

BACKGROUND

1. Field

Disclosed are nozzle configurations for rocket vehicles where the nozzles are not located at the optimal thrust axis of the vehicle. Two examples include nozzles located on the forward end of the vehicle (also called tractor nozzles) and attitude control nozzles located on the periphery of the vehicle. More particularly, the disclosed nozzle shapes enhance the axial thrusts and/or maneuver torques on the vehicle.

2. Description of the Related Art

In conventional rocket nozzle design, the flow and pressure in the nozzle is evaluated as a simple function of the local area to the throat area. FIG. 1 illustrates an axisymmetric nozzle 10 as known from the prior art. The average pressure at each station in the nozzle 10 can be found by inverting the following equation relating the area ratio $A/A_t$, pressure ratio $P_c/P$ and specific heat ratio gamma, $\gamma$.

$$\frac{A}{At} = \frac{(P_c/P)^{\frac{\gamma+1}{2\gamma}}}{\left[\frac{\gamma+1}{2}\right]^{\frac{\gamma+1}{2(\gamma-1)}}\sqrt{\frac{2}{\gamma-1}\left[(P_c/P)^{\frac{\gamma+1}{\gamma}}-1\right]}} \quad (1)$$

A is local flow area measured in square inches;
At is the sonic throat area measured in square inches;
$P_c$ is the chamber total pressure measured in pounds per square inch;
P is local flow pressure measured in pounds per square inch; and
$\gamma$ is specific heat ratio (unit-less).

Even this calculation has its limits in that the pressure, p, is the average at a station and the wall pressure may be more or less than the average p, a function of $P_c$ and $(A/A_t)$. This technique has been successfully employed to design axisymmetric nozzles following simple rules. Gas flows into the nozzle 10 at subsonic speed and through a converging portion 12 that terminates at throat 14. The gas then flows at supersonic speed through diverging portion 15 and through exit 16. The supersonic flow in the nozzle 10 responds to changes in the nozzle wall contour 17 through expansion or shock waves. These waves will travel from their origin across the nozzle 10 to the opposite side where they reflect and cross back and forth as the flow accelerates from the throat 14 to the exit 16. These waves are called characteristics or Mach waves and in the days before Computational Fluid Dynamics (CFD), were used to design and analyze the flow in a nozzle 10.

FIG. 2 shows how these Mach waves 18 influence the flow and pressure in the diverging portion 15 of a simplified two dimensional nozzle with a supersonic starting Mach number. This nozzle has a single wall angle change, β, from an axial throat 14 to a 15° expansion. The flow in the nozzle can be broken into several different zones of uniform but strikingly different properties. Zone 0 is the supersonic flow at the throat 14 of the nozzle. An exemplary Mach number is 1.5 and the pressure is 29% of the total pressure of the approaching flow. Zone 1 is downstream of the 15° outward turn. The exemplary Mach number has increased to 1.944 and the pressure has dropped to 14.5%. In Zone 1, the flow properties are uniform and the flow direction is parallel with the nozzle surface. A number of waves can be seen originating at the transition corner 22 and fanning out. This is the well known Prandtl-Meyer Expansion. These Mach waves 18 expand from the origin due to the increasing Mach number as the flow turns and accelerates around the transition corner 22. These waves cross the nozzle centerline 24 generating a Zone 2. In Zone 2, the crossing of the waves from opposite sides of the nozzle cause more turning and acceleration of the flow. The exemplary flow in Zone 2 is now moving parallel to the axis 24 at Mach 2.41 and 6.5% of the total pressure. As the waves continue to crisscross the nozzle, no more Zones of uniform properties are formed in this example and each point in the flowfield has varying Mach number, pressure and flow direction all resulting from the interactions with these waves. If the nozzle is cut off at a fixed length, the average properties at the exit 16 will determine the resulting thrust. Since the flow in not perfectly uniform and axial, a nozzle efficiency term is usually applied for delivered nozzle performance.

In a more general case, the wall contour 17 is not uniform as in this example and the pressure acting on the wall is affected directly by changes in wall angle and waves from the opposite side of the nozzle. Since the Mach waves move at the local speed of sound in the gas, they move away from the wall and are swept downstream by the supersonic flow. This means that wall angle changes affect the local pressure and the pressure on the opposite wall well downstream of the origin of that change. If, for example, the lower wall 26 was terminated at point A, the flow would expand out and downward causing another expansion fan to travel from A to B. Since B is beyond the exit of the nozzle the removal of this lower wall section will not change the pressures on the upper wall 28.

In most rocket propelled vehicles, one or more rocket nozzles are located at the aft end and aligned close to the vehicle axis to convert most of the thrust in flight direction. Some applications exist that preclude this aft location for nozzles. Exemplary tractor nozzle applications are the TOW missile and the escape motor for the Orion, Crew Exploration Vehicle. In another application, multiple rocket nozzles are arrayed around the vehicle for maneuvering. For both of these applications, using conventional nozzles can have a detrimental effect on vehicle performance.

Referring to FIG. 3, the launch abort system 30 of an Orion Crew Exploration Vehicle 32, or similar rocket, has a payload 34 that includes a crew module 36 and a service module 38 located forward of booster rocket 40.

In the event that it becomes necessary to abort the mission prior to separation of the booster rocket 40 from the payload 34, abort motor 42 is ignited generating propellant gases that are expelled through nozzles 44. Nozzles 44 are angularly disposed in an aftward direction to the intended direction of flight of the vehicle and generate a thrust effective to separate the launch abort system and crew module 30 from the remainder of the vehicle 32. This propulsion system has a number of limitations. Hot propellant gases expelled by the nozzles 44 impact the abort motor 42 and crew module 36. These components must be designed to withstand the high temperatures that may be generated by impingement of the propellant gases. One approach, that was utilized on the Apollo program, is to cant the nozzles 44 at an extreme angle to expel the hot propellant gases sufficiently outward from the rocket components to avoid the most severe temperature increases. However, deviation of the nozzle direction from directly aftward causes a loss of thrust requiring abort motor 42 to be charged with additional propellant.

These limitations are illustrated in more detail in FIGS. 4 and 5. Referring to FIG. 4, when the nozzle 44 is canted at an angle, α, relative to direction of flight 46, the cant angle on the multiple nozzles causes a loss in thrust that is roughly equal to (1−cos α) which at 30 degrees of cant represents a thrust loss of 13%.

Nozzles 44 project outward from exterior walls 48 of the abort motor 42 that are arrayed around motor centerline 47. The abort motor 42 includes a propellant 49 that when ignited generates propellant gases. The propellant gases pass through nozzle throat 14 and are accelerated through divergent portion 15 of the nozzle. If the cant angle, α, of the nozzle is greater than the divergence angle, β, the wall 50 of the nozzle 44 generates a negative thrust due to the local nozzle pressures acting in a rearward direction. The opposite effect is seen on wall 53. Here the wall pressures 55 have a larger forward projected area and contribute more to the net thrust of the nozzle 44. However, with the conventional nozzle 44, the thrust is significantly less than an axially directed nozzle (due to the cosine loss from the previous paragraph).

Referring now to FIG. 5, the abort motor 42 must function from sea level static to very high altitudes. The most important condition is likely to be at the maximum dynamic pressure (max Q) point in the assent trajectory. This is the point of highest drag and stress on the vehicle and is the most challenging for the design of the escape system. Under these conditions, the approaching supersonic flow 52 causes a bow shock wave 54 and elevated pressures that deflect the rocket plume 56 back towards the motor exterior walls 48 and crew module 36. With reference to FIG. 6, this results in impingement of underexpanded rocket plume 56 on the exterior wall 48 at attachment point 58. The plume impingement separates the boundary layer 60 which on reattachment, results in a hot spot that may degrade the exterior wall 48 structural capability.

Referring back to FIG. 5, making the situation worse is the fact that the attachment point 58', 58", 58''' shifts with flight speed. A second problem is that despite a large cant angle, a, the exhaust plume 56' still interacts with the crew module 36. Increasing the distance between the nozzles 44 and crew module 36 will reduce the heating caused by the plume 56' but will not avoid the flow reaching the forward surface of the crew module.

The crew module 36 typically includes roll control nozzles 62 that control module roll while in orbit. As shown in FIG. 7, the roll control nozzle 62 has an exit portion that is flush with the perimeter 64 of the crew module 36 or other space vehicle. The function of this rocket thruster is to control the orientation of the vehicle by providing a torque about its center of mass (CG). A conventional roll control nozzle 62 is installed with one exit side 65 flush with the vehicle perimeter 64, the nozzle is then scarfed so that the opposing exit side 67 is also flush with the vehicle perimeter (no portion of the nozzle protrudes from the vehicle). The expanding gases in the nozzle apply a force F1 along the nozzle axis and also F2 normal to the nozzle axis. The intended roll controlling torque is F1*R1 while the scafing creates a counter torque (F2*R2) on the unbalanced surface A2. The net torque, τ, applied to the vehicle is then:

$$\tau = F1*R1 - F2*R2 \qquad (2)$$

Compensation for the counter torque requires more propellant to be consumed for a given maneuver than desired.

There remains a need for improved rocket nozzles, such as for a launch abort system, or the capsule attitude control system, that overcomes this loss of vehicle performance.

BRIEF SUMMARY OF THE INVENTION

Disclosed are nozzle configurations for rocket vehicles where the nozzles are not located at the optimal thrust axis of the vehicle. Two examples include nozzles located on the forward end of the vehicle (also called tractor nozzles) and attitude control nozzles located on the periphery of the vehicle. More particularly, the disclosed nozzle shapes enhance the axial thrusts and/or maneuver torques on the vehicle The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

Like reference numbers and designations in the various drawings indicated like elements.

DETAILED DESCRIPTION

Figure 1:
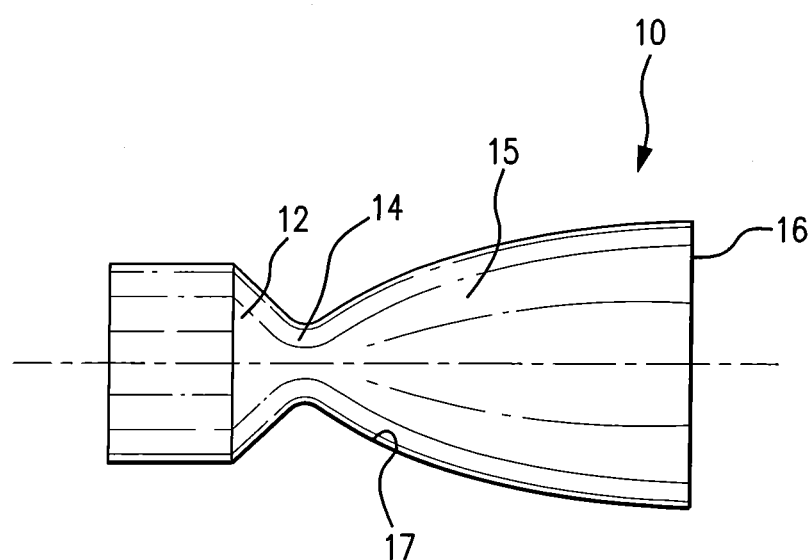
FIG. 1 illustrates an axisymmetric rocket nozzle as known from the prior art.
Figure 2:
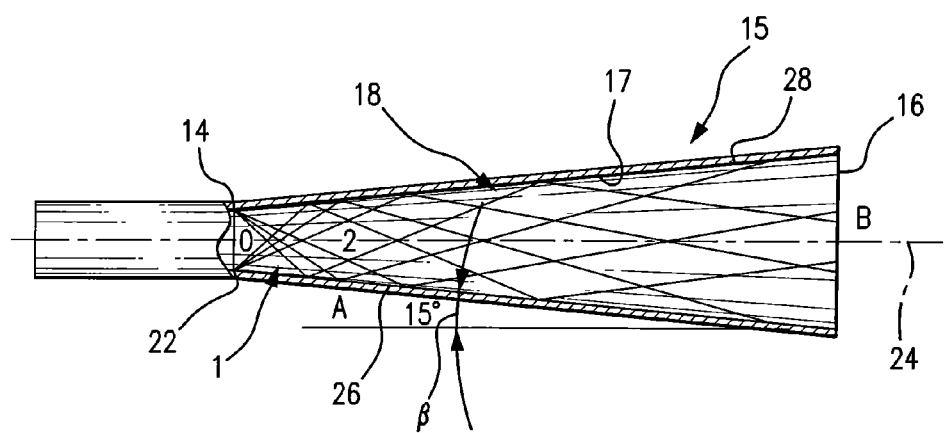
FIG. 2 illustrates characteristic waves of a propellant gas expanded in the prior art axisymmetric rocket nozzle of FIG. 1.
Figure 3:
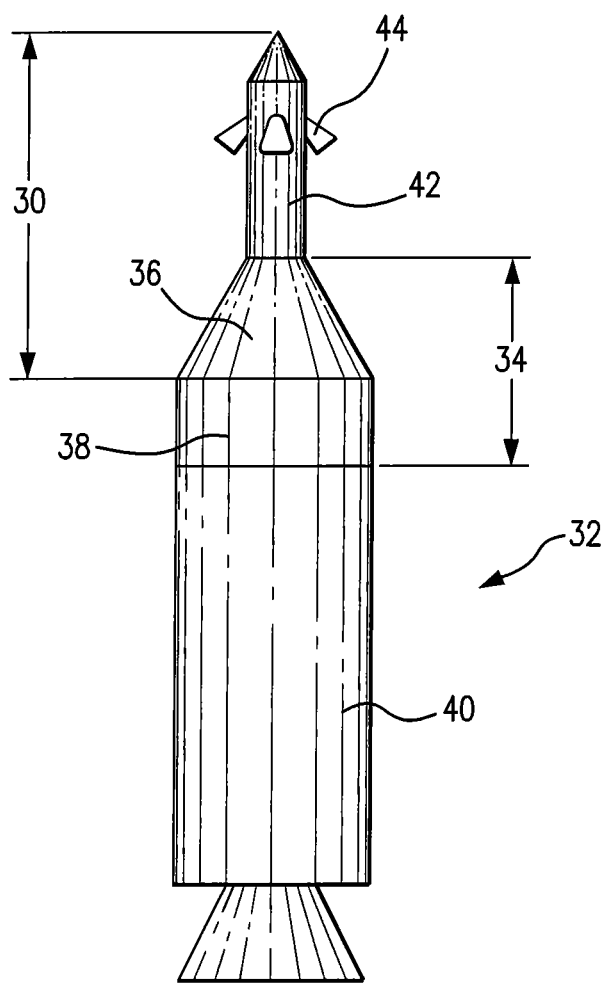
FIG. 3 illustrates in a launch abort system with tractor nozzles as known from the prior art.
Figure 4:
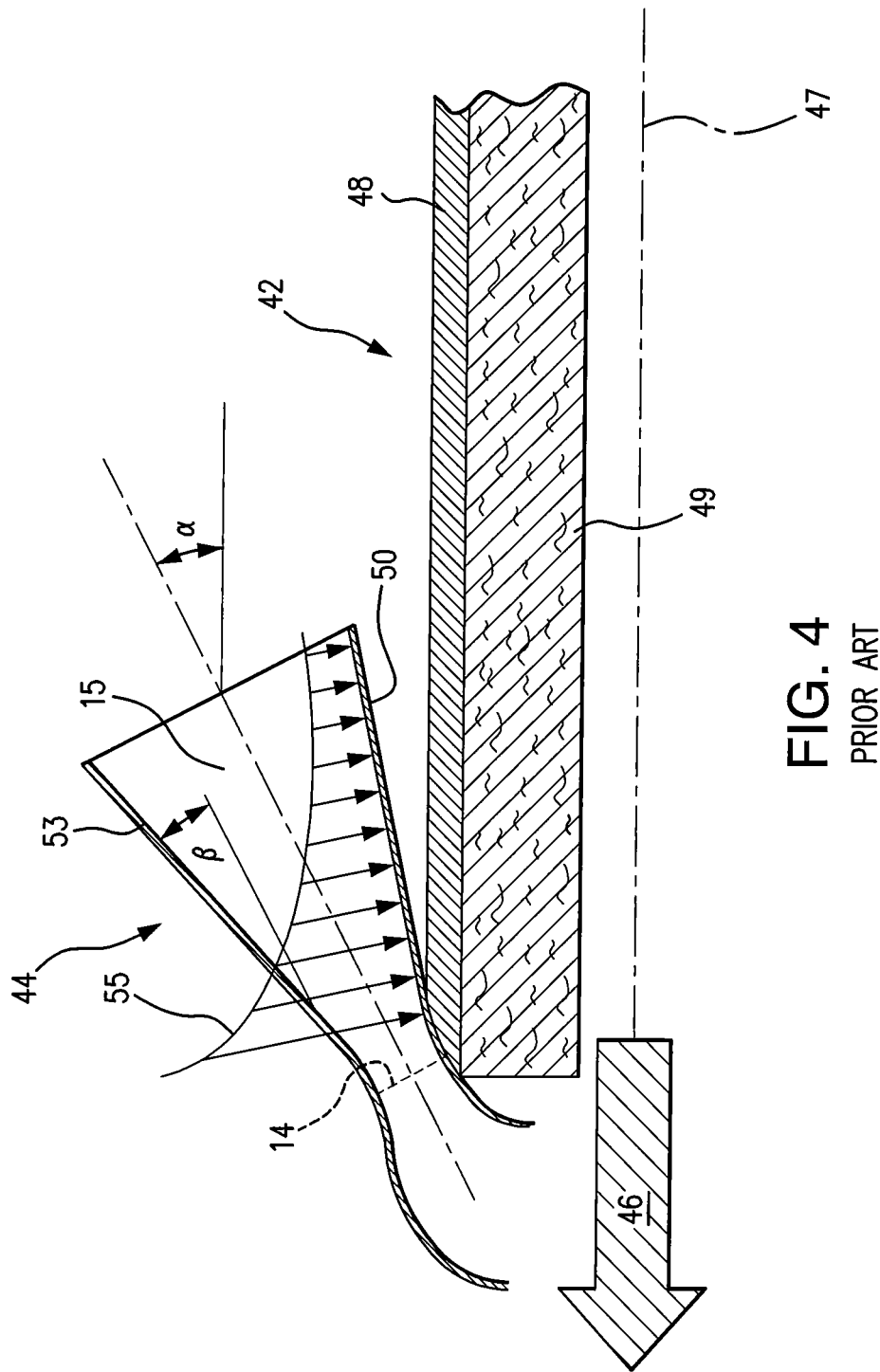
FIG. 4 illustrates a loss of thrust associated with the prior art tractor nozzles of FIG. 3.
Figure 5:
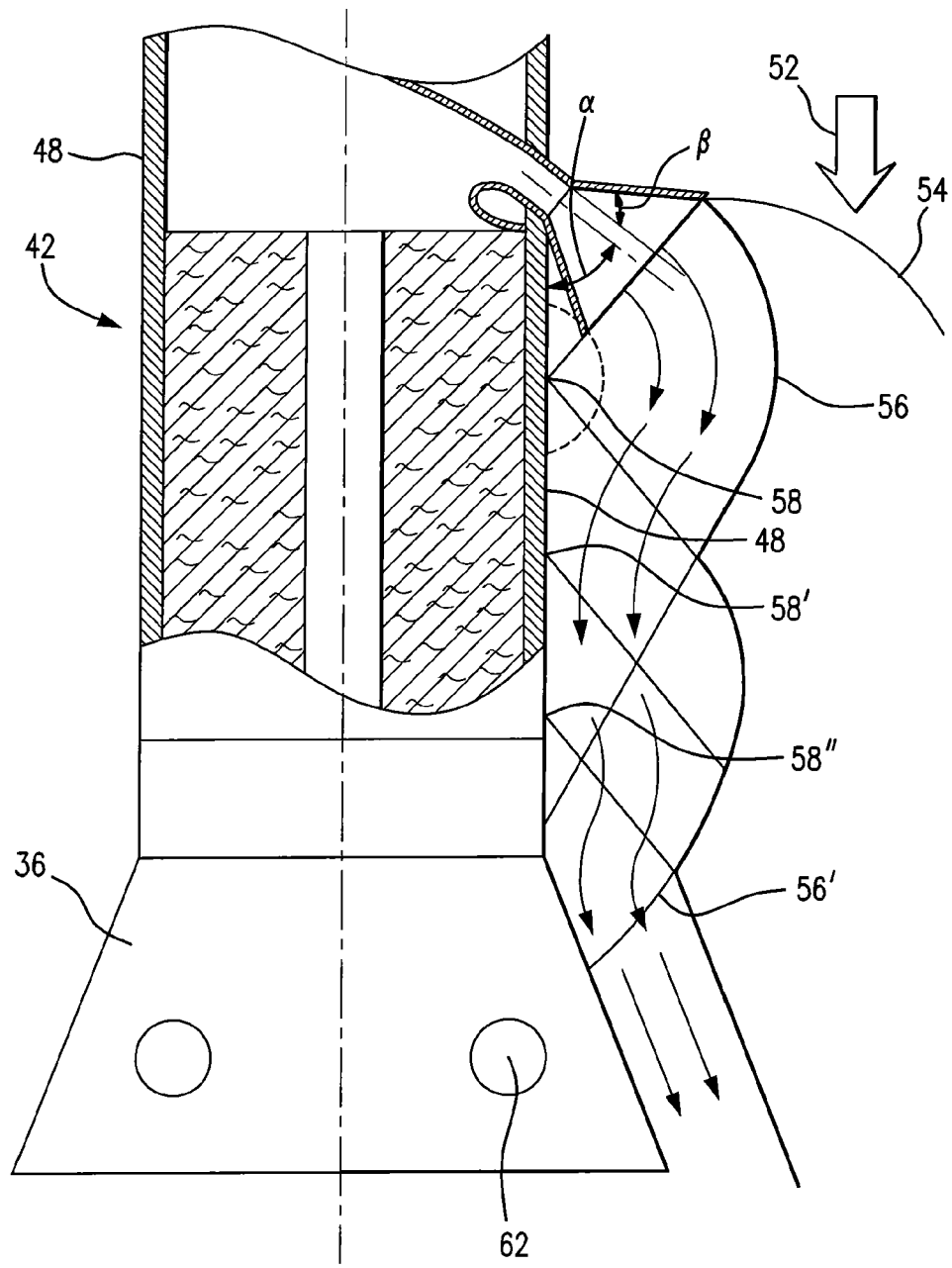
FIG. 5 illustrates plume impingement occurring with the prior art tractor nozzles of FIG. 3.
Figure 6:
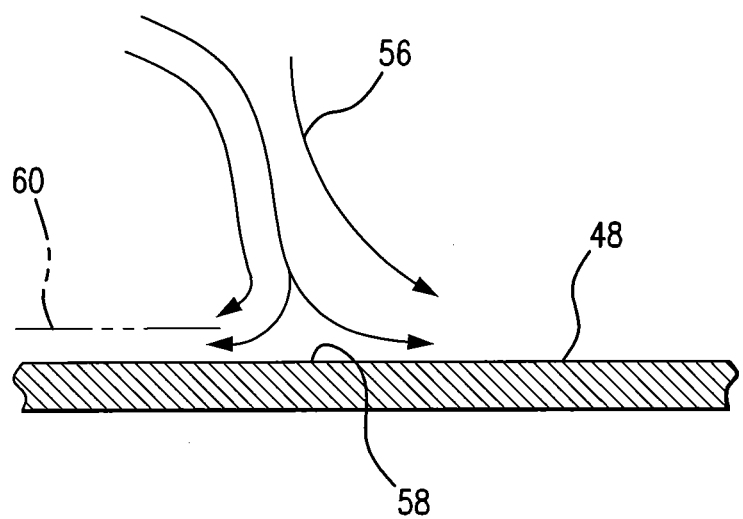
FIG. 6 illustrates separation of the boundary layer and formation of a hot spot as a result of the plume impingement of FIG. 5.
Figure 8:
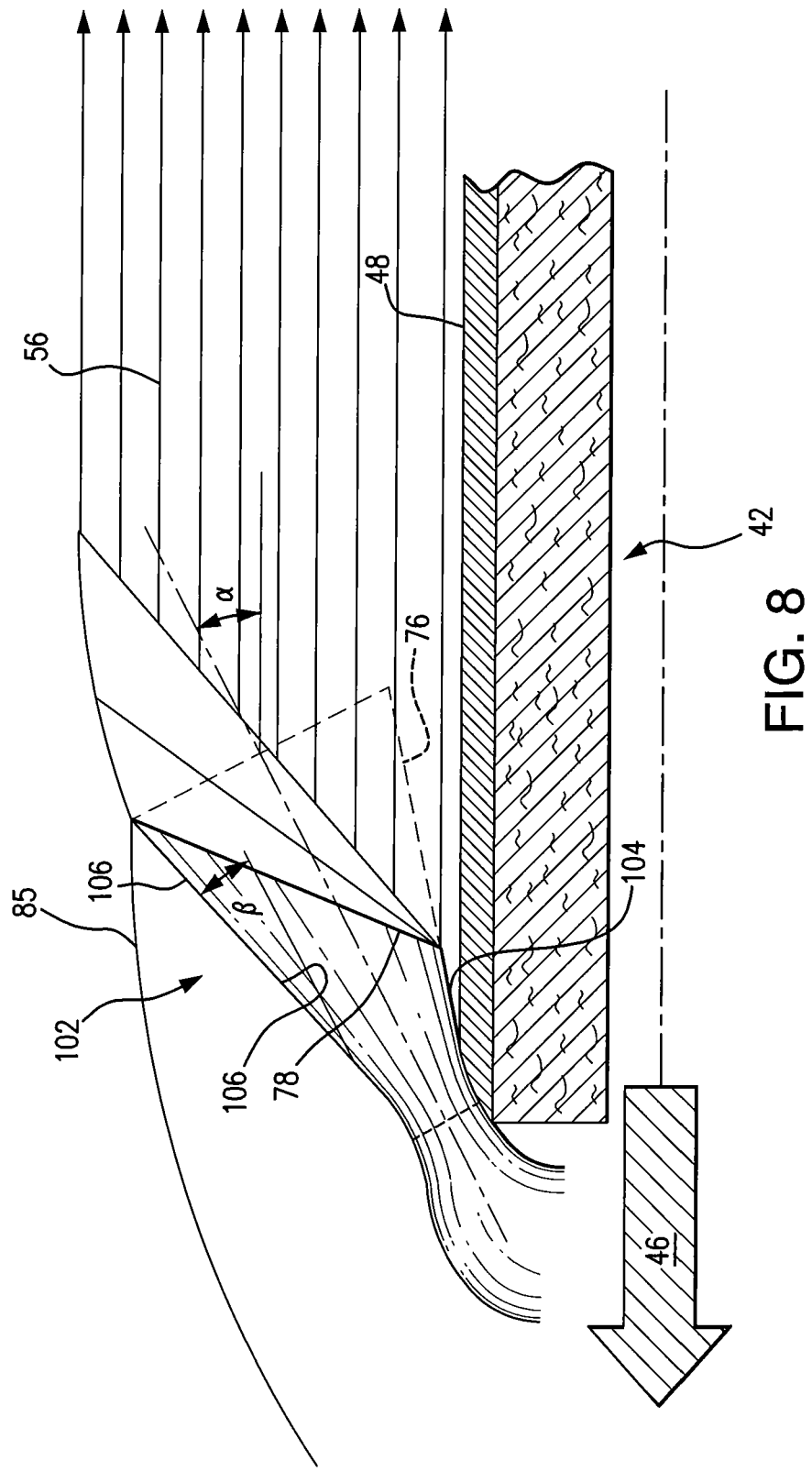
FIG. 8 illustrates a first embodiment of tractor nozzle that does not have the limitations of the prior art.

FIG. 8 illustrates a first embodiment of a nozzle 102 that does not have the disadvantages described hereinabove. The nozzle 102 protrudes from an exterior wall 48 of a rocket motor, such as abort motor 42. The nozzle 102 protrudes from the exterior wall 48 and is angularly disposed in an aftward direction relative to the direction of flight 46. An optional faring 85 can be used to reduce the drag on the projecting nozzle. The nozzle 102 has an aft surface portion 104 that is adjacent to the exterior wall 48 and a fore surface 106. When viewed relative to the direction of flight 46, aft surface portion 104 extends rearward for a lesser distance than the opposing fore surface 106. Nozzle 102 is essentially a fragment of the nozzle 44 (FIG. 4). Broken line 76 identifies in phantom that portion of the nozzle 44 omitted from the nozzle 102. More precisely, that portion of the aft surface 104 of the nozzle to the rear of the point of attachment of the last characteristic (Mach wave 78) that can reach the fore surface 106 is removed. This will increase the thrust by 10% or more because some of the negative thrust generated by the pressure acting on the aft surface 104 is eliminated.

The rocket plume 56 reacts to the change in nozzle 102 contour by turning and accelerating to a higher Mach number. This thrust increase is due to both the greater expansion and more axial jet angle, that is the exhaust flow is nearly axial in direction. By nearly axial, it is meant that axial jet angle has a deviation of less than 10° relative to the longitudinal axis 107 of the vehicle. By omitting the forward facing wall of the aft portion 104 of the nozzle, the flow is allowed to turn onto the exterior wall 48 of the motor case. This results in the flow remaining attached with little or no boundary layer separation keeping the heat flux similar to that within the nozzle 102. This thermal environment is then more benign and consistent over the flight speeds.

Figure 10:
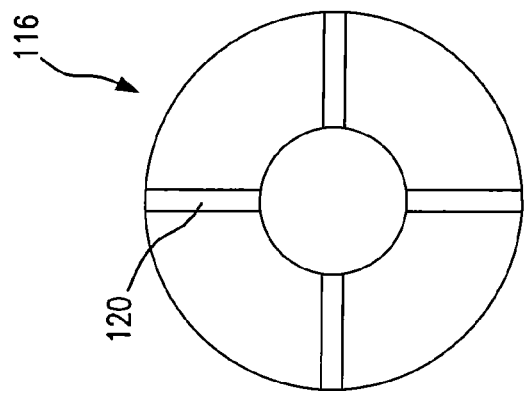
FIG. 10 is a front planar view of support web for the nozzles disclosed herein.
Figure 9:
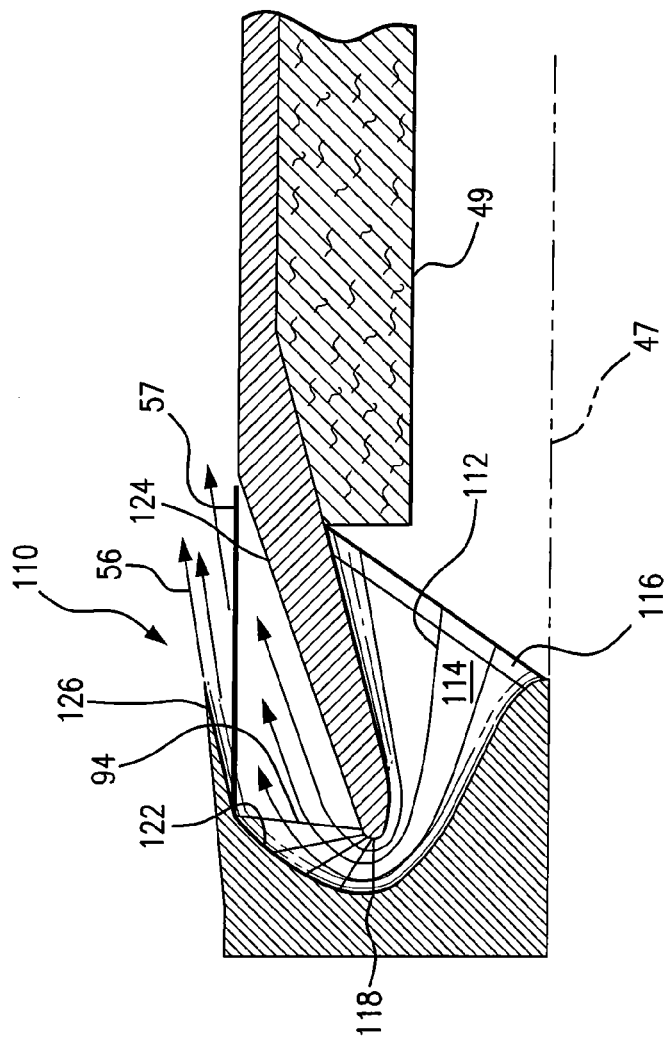
FIG. 9 illustrates a second embodiment of tractor nozzle that does not have the limitations of the prior art.

FIG. 9 illustrates in cross-sectional representation a nozzle 110 in accordance with a second embodiment that does not have the disadvantages identified hereinabove. In this embodiment, propellant gas 112 generated by burning propellant 49 passes through subsonic converging portion 114 that is supported by structural web 116, that is shown in end view in FIG. 10.

Returning to FIG. 9, the propellant gases 112 then flow through an internal throat 118 while traveling at an angle that is approximately 90° from the motor axis 47. The forward and aft surfaces of the nozzle 110 are connected by a series of webs (120, see FIG. 10) that interrupt the throat 118 to carry the loads. The flow is first turned through a large angle by Prandtl-Meyer expansion waves 94. A forward surface 122 of the nozzle 110 is defined by the expansion waves 94. The forward surface 122 is exposed to a high but declining pressure. The rear surface 124 is exposed to a uniform and low pressure. As the flow exits the outer diameter of the motor, a small rearward deflector 126 in the projected forward surface 122 generates a local high pressure increasing the thrust and making the emerging flow 56 more axial. If the resulting shock wave 57 does not reach the aft surface 124, no negative thrust is created.

Figure 11:
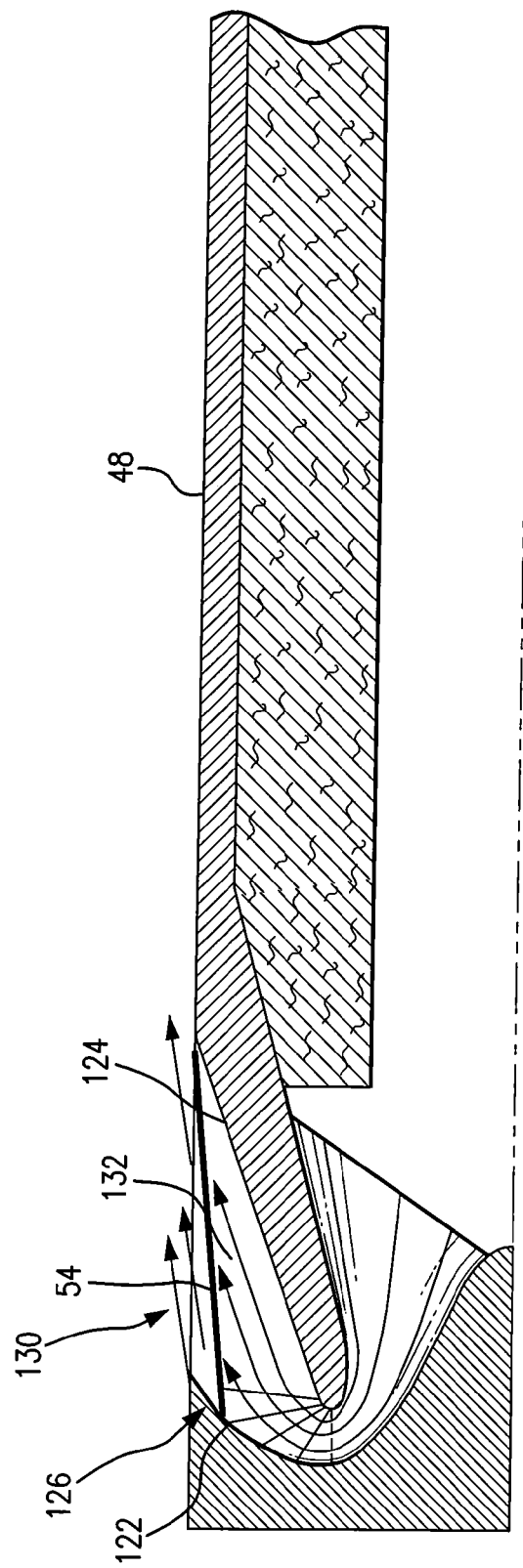
FIG. 11 illustrates a third embodiment of tractor nozzle that does not have the limitations of the prior art.

As shown in FIG. 11, if a fully submerged nozzle 130 is desired, that is nothing sticking out into the airstream; the diverging expansion portion 132 is terminated at the motor case diameter 48. An increase in thrust can be achieved by adding a slight rearward deflector 126 to the end of the forward nozzle surface 122. As in the preceding embodiment, deflector 126 is located so that the resulting shock wave 54 does not reach the aft surface 124.

Figure 7:
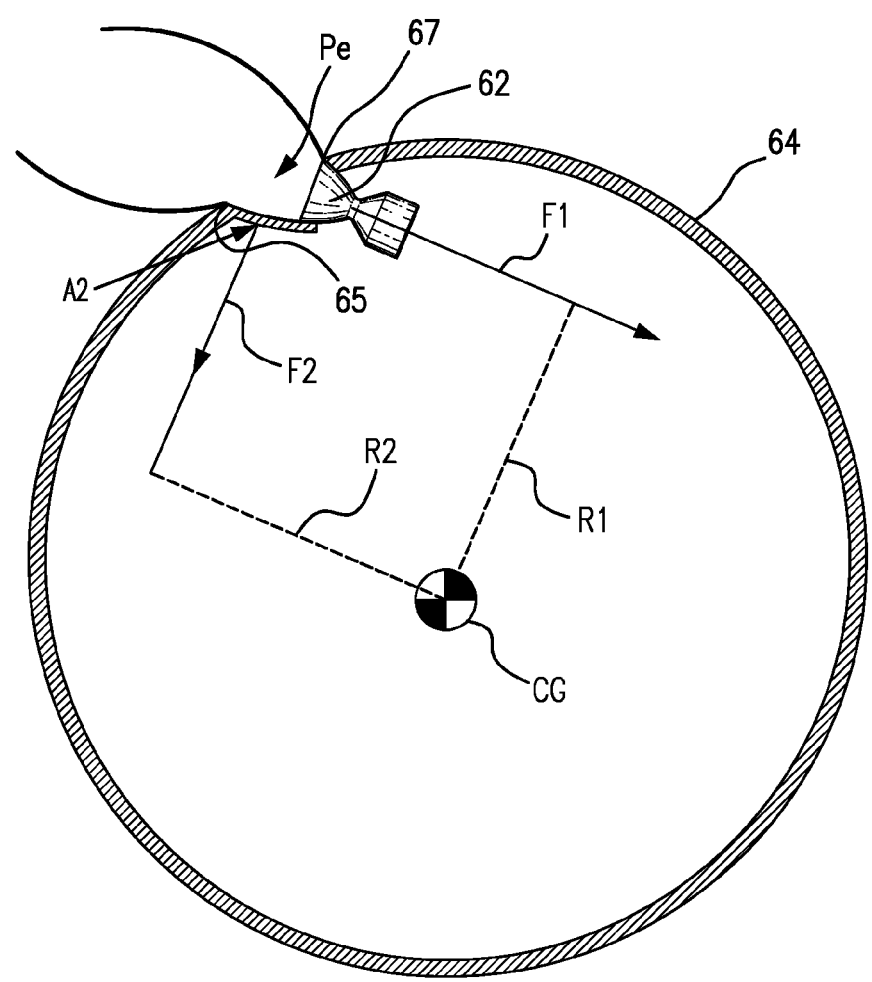
FIG. 7 illustrates a roll control nozzle as known from the prior art.
Figure 12:
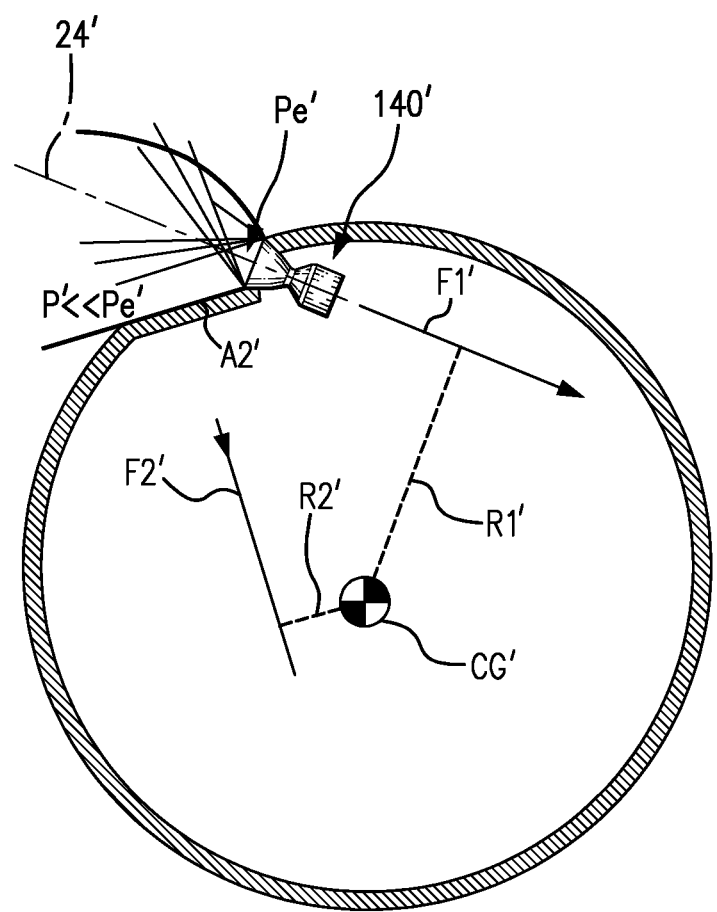
FIG. 12 illustrates a first embodiment of a nozzle for a roll control motor that does not have the limitations of the prior art.
Figure 13:
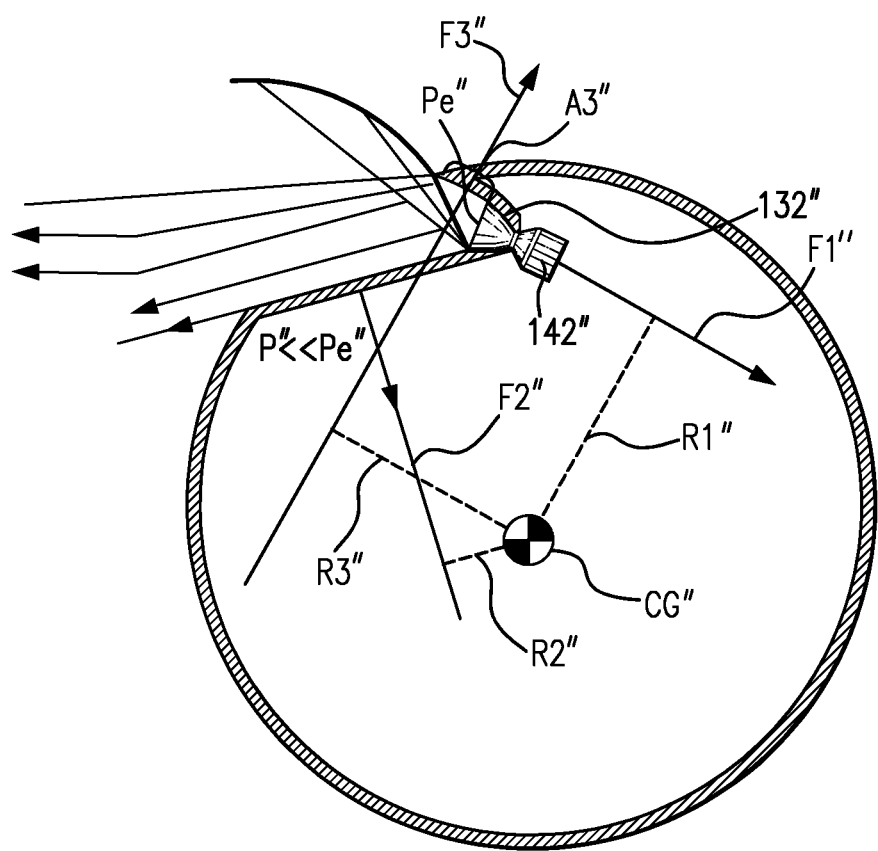
FIG. 13 illustrates a second embodiment of a nozzle for a roll control motor that does not have the limitations of the prior art.
Figure 14:
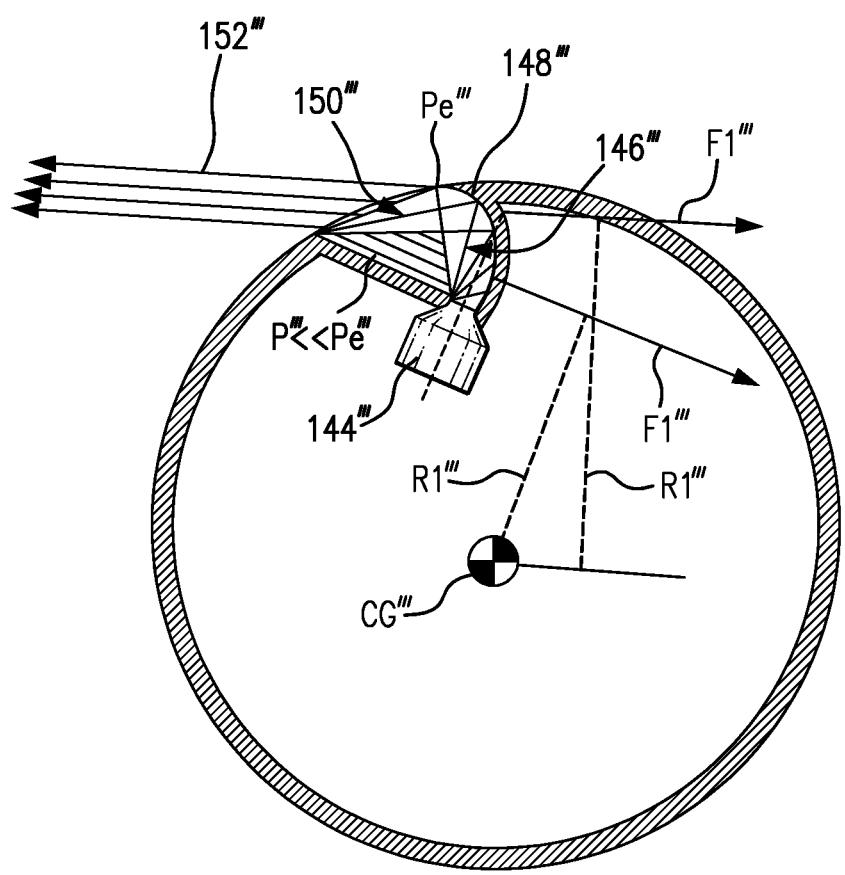
FIG. 14 illustrates a third embodiment of a nozzle for a roll control motor that does not have the limitations of the prior art.

For vehicle maneuvering thrusters, the counter torque of prior art integrations exemplified by FIG. 7 are mitigated by embodiments illustrated in FIGS. 12-14. In a first embodiment illustrated in FIG. 12, the surface A2' that generates the counter torque, is displaced away from the centerline 24 of the nozzle 140, in a direction towards the vehicle center, CG. This reduces the pressure, P', acting on the surface A2' and reduces its moment arm R2. The torque, τ' is increased because:

$$\tau'=F1'^*R1'-F2'^*R2' \quad (4)$$

$$F2'=P'^*A2'<P^*A2 \quad (5)$$

P' is much less than P and R2' is less than R2 from the FIG. 7 embodiment.

In a second embodiment for a roll control nozzle 142", shown in FIG. 13, the favorable surface of the diverging expansion portion 132" is elongated by extension portion A3" thereby further increasing the roll torque, τ". In this embodiment, $$\tau''=(F1''^*R1''+F3''^*R3'')-(F2''^*R2'') \quad (6)$$

and the contribution to desired torque is enhanced by (F3*R3) while the undesired counter-torque is reduced due to a small value for F2" as disclosed in the preceding embodiment.

In a third embodiment for a roll control nozzle 144, shown in FIG. 14, the nozzle maximizes torque production. In this embodiment the flow is first rapidly expanded by a centered Prandtl-Meyer Expansion 146. This expansion can turn the flow by 90° or more while lowering the pressure to a small fraction of its initial value. The exterior most portion 148 of the nozzle 144 is then over-turned, that is turned faster than the Prandtl-Meyer Expansion would create, thus causing the local nozzle wall pressure to rise due to a net compression 150 of the flow. This causes a further deflection of the flow shown by the jet 152. This increases the torque due largely to the change in the thrust vector direction and its larger resulting moment arm R''' even if the thrust magnitude F''' is unchanged.

One or more embodiments of the present invention have been described. Nevertheless, it will be understood that various modifications may be made without departing from the spirit and scope of the invention. Accordingly, other embodiments are within the scope of the following claims.

What is claimed is:
1. A vehicle, comprising;
a payload;
a crew module;
vehicle maneuvering thrusters submerged into an exterior surface of said vehicle, said vehicle maneuvering thrusters controlling roll of the vehicle and having a converging portion adjacent a source of subsonic propellant gas that provides propellant gas as needed for each given maneuver, a throat effective to accelerate said propellant gas to supersonic velocity and a diverging nozzle portion disposed about a centerline;
said diverging nozzle portion terminating at both a first exit portion submerged within said vehicle and an opposing second exit portion also submerged within said vehicle;
wherein a first extension portion extends from said first exit portion to said exterior surface at a first angle relative to said centerline, a second extension portion extends from said second exit portion to said exterior surface at a second angle relative to said centerline, and said angle is larger than said first angle such that said first extension and said second extension are asymmetrical with respect to said centerline.
2. The vehicle of claim 1 wherein said first extension portion is substantially parallel to said centerline.
3. The vehicle of claim 2 wherein said second extension portion is offset from said centerline in a direction toward said vehicle center of mass.

4. The vehicle of claim 1 wherein a length of said second extension portion is longer than a length of said first extension portion.

* * * * *